Figure 1:
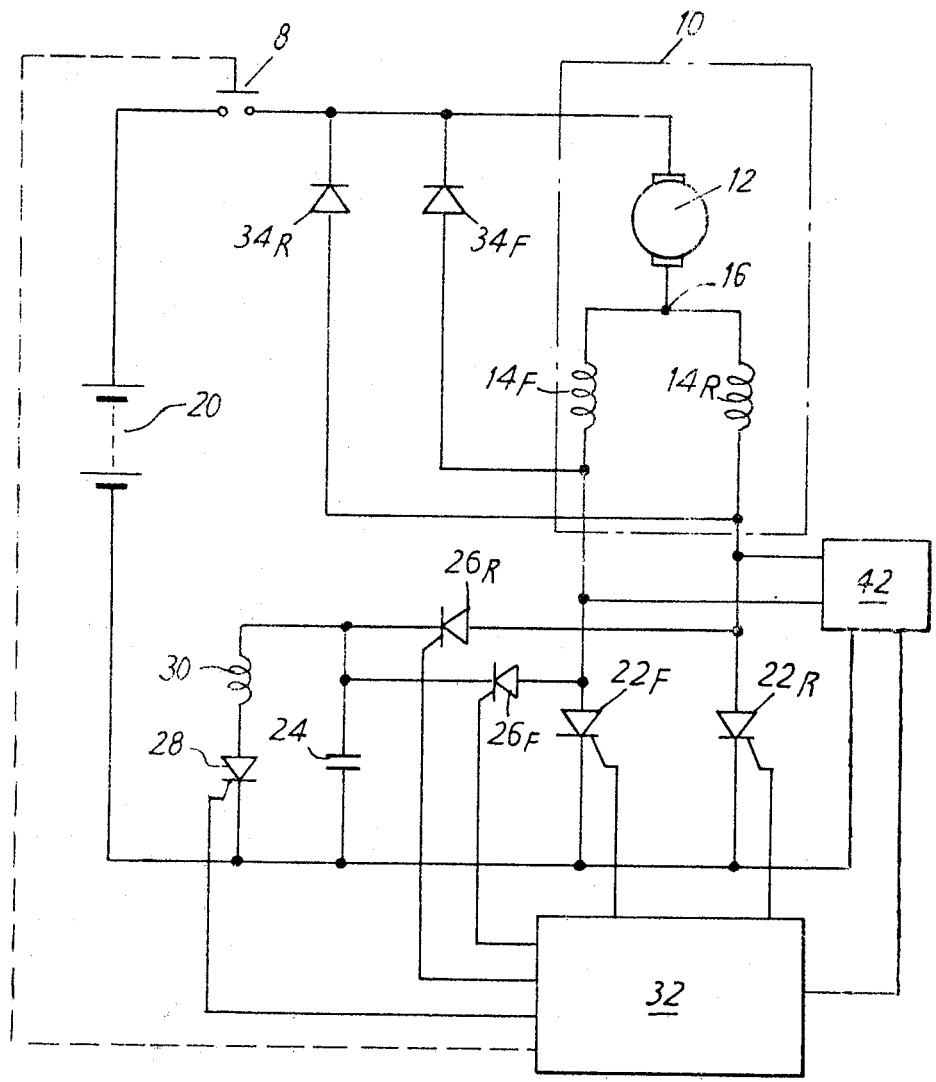

United States Patent [19]

Sloan

[11] 4,406,979

[45] Sep. 27, 1983

[54] FAIL-SAFE SYSTEM FOR PULSE-CONTROLLED THREE-TERMINAL D.C. MOTOR

[75] Inventor: Albert E. Sloan, Gateshead, England

[73] Assignee: Technical Operations Limited, Gates Head Nell, England

[21] Appl. No.: 243,486

[22] Filed: Mar. 13, 1981

[30] Foreign Application Priority Data

Mar. 18, 1980 [GB] United Kingdom ............... 8009096

[51] Int. Cl.³ .............................................. H02P 5/16
[52] U.S. Cl. ................................... 318/255; 318/297; 361/33
[58] Field of Search ............... 318/296, 255, 297, 298, 318/299; 361/23, 24, 30, 31, 33

[56] References Cited

U.S. PATENT DOCUMENTS

| | | | |
|---|---|---|---|
| 965,059 | 12/1908 | Apple | 361/23 |
| 3,727,118 | 4/1973 | Makino | 318/297 |
| 3,818,291 | 6/1974 | Miyake | 318/139 |

Primary Examiner—J. V. Truhe
Assistant Examiner—A. Evans
Attorney, Agent, or Firm—Edward F. Perlman

[57] ABSTRACT

A pulse control circuit for a d.c. series motor having an armature and two oppositely-wound field windings, comprises a contactor in series with the motor, two main thyristors each connected in series with the armature and a respective one of the field windings, means for controlling the mark-to-space ratio of conduction of each thyristor, one or other of the main thyristors being brought into operation in dependence upon the desired direction of drive of the armature, means for sensing failure of commutation of the main thyristor, and means for causing opening of the contactor in response to such sensing. The control circuit includes means for firing the other main thyristor immediately commutation failure is sensed, thereby to limit the net field flux and motor torque in the period during which the contactor is opening.

5 Claims, 3 Drawing Figures

FAIL-SAFE SYSTEM FOR PULSE-CONTROLLED THREE-TERMINAL D.C. MOTOR

This invention relates to pulse control circuits for d.c. motors.

In particular, the invention relates to motors of the kind having two field windings wound in opposite senses, so that the direction of drive of the motor can be selected by energising one or other of the field windings. Such motors are often referred to as three-terminal motors, having one armature terminal and two field terminals, since the junction of the armature with the two field windings is not normally accessible. There are known pulse control circuits for such motors which employ two main thyristors each connected in series with the armature and a respective one of the field windings, firing circuit means and commutating means for the two main thyristors and means for controlling the mark-to-space ratio of switching of the main thyristor, one or other of the main thyristors being brought into operation in dependence upon the desired direction of drive of the armature. If during operation of the motor the main thyristor in operation fails to be commutated, the motor current can rise to a very high level with a danger of damage to the motor and controller. It is therefore usual to provide a fail-safe circuit which detects such a failure of commutation and in response to the failure causes a line contactor in series with the motor to open thereby to disconnect the motor from the d.c. supply.

A disadvantage of such fail-safe systems in that it takes a relatively long period, typically of 50 to 100 milliseconds, for the line contactor to open after the commutation failure is detected. During this period the motor current can rise to a high level, producing a high armature torque. This is particularly disadvantageous if the motor is employed to drive a vehicle, since the high torque applied to the vehicle transmission system causes the vehicle to accelerate rapidly before the line contactor opens. On road vehicles in particular, where the power-to-weight ratio may be high, this can cause the vehicle to lurch forwards, with consequent danger of damage to other vehicles and pedestrians.

It is an object of this invention to provide a pulse control system for a motor of the kind referred to above, with an improved fail-safe system.

This invention consists in a pulse control circuit for a d.c. series motor having an armature and two oppositely-wound field windings, comprising a contactor in series with the motor, two main thyristors each connected in series with the armature and a respective one of the field windings, firing circuit means and commutation circuit means for the main thyristors, means for controlling the firing and commutation of each main thyristor thereby to control the mark-to-space ratio of the thyristor, one or other of the main thyristors being brought into operation in dependence upon the desired direction of drive of the armature, means for sensing failure of commutation of the main thyristor in operation, and means for causing opening of the contactor in response to such sensing, characterised in that there are provided means for firing the other main thyristor immediately commutation failure is sensed, thereby to limit the net field flux in the period during which the contactor is opening.

By rendering both main thyristors conducting simultaneously, so that the current flows through both field windings, the net flux in the motor is reduced rapidly to zero, thus reducing the driving torque to zero. Since the thyristor can be switched on very rapidly, the time taken to reduce the torque to zero is effectively dependent only on the time constant of the field winding, typically less than 20 milliseconds. Motor torque is therefore limited during the drop-out time of the contactor, i.e. the period in which the contactor is opening.

Figure 2:
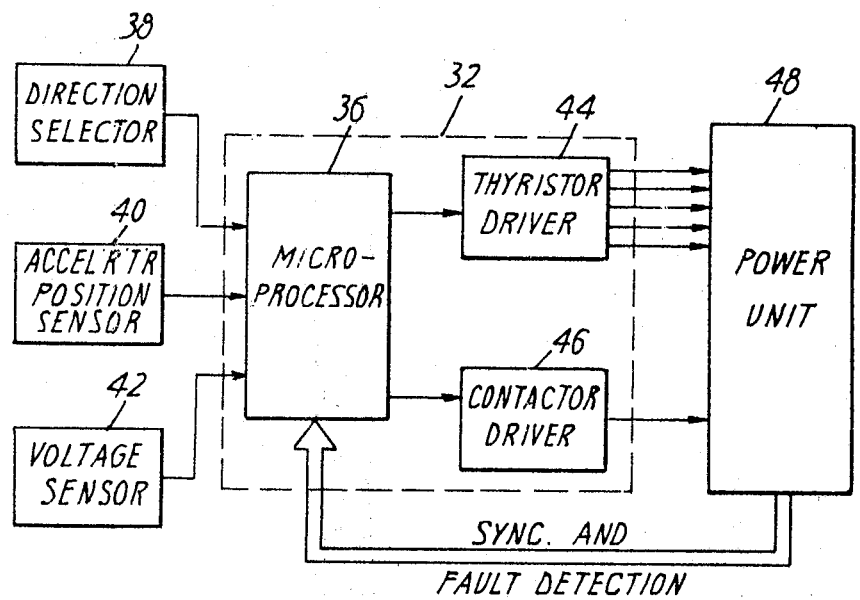
Figure 3:
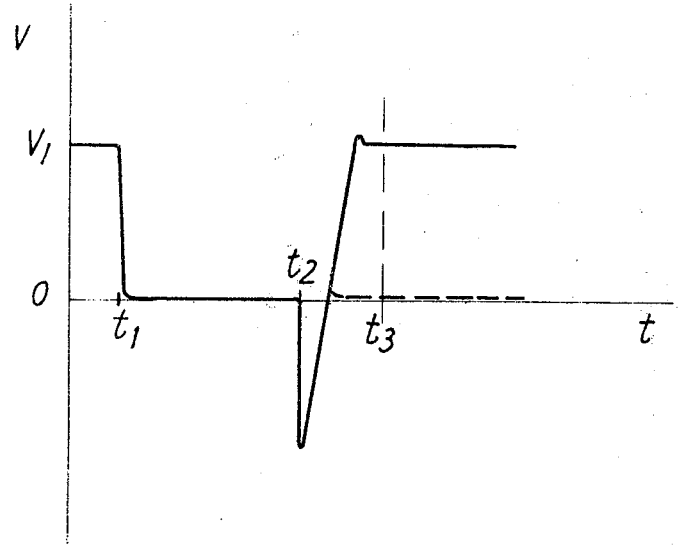

The invention will now be described, by way of example, with reference to the accompanying drawings, in which:

FIG. 1 is a circuit diagram of a three terminal electric motor providing with a pulse control circuit in accordance with the invention, FIG. 2 is a block diagram of part of the control circuit of FIG. 1, and FIG. 3 is a graph showing the variation with time of the voltage across a main thyristor of the control circuit.

Referring to the drawings, a three terminal motor 10 has an armature 12 and two field windings $14_F$ and $14_R$ connected to one side of the armature 12 at a common point 16. The other side of the armature is connected to the positive terminal of a battery 20 through a normally-open line contactor 8. Field windings $14_F$ and $14_R$ are connected separately to the negative terminal of the battery through respective main thyristors $22_F$ and $22_R$, so that they can be separately energised. The field windings $14_F$ and $14_R$ are wound in opposite senses, so that energisation of winding $14_F$ produces a driving torque in the "forward" direction whilst energisation of winding $14_R$ produces a driving torque in the "reverse" direction.

Main thyristors $22_F$ and $22_R$ are provided with a commutation circuit consisting of a common commutating capacitor 24 which is connected in series with a commutating thyristor $26_F$ across main thyristor $22_F$ and in series with a commutating thyristor $26_R$ across main thyristor $22_R$. A charge reversal thrysistor 28 is connected in series with an inductor 30 across the commutating capacitor 24. The various thyristors are fired by signals from control circuit 32. When the motor is to be driven forwards a signal from a direction selector switch or circuit 38 (FIG. 2) causes the control circuitry to pulse main thyristor $22_R$ whilst main thyristor $22_R$ remains commutated.

A freewheel diode $34_F$ is connected across field winding $14_F$ and armature 12. A second freewheel diode $34_R$ is similarly connected across field winding $14_R$ and armature 12.

As shown in FIG. 2, the control circuitry 32 includes a microprocessor 36 which receives inputs from the direction selector 38 and an accelerator position sensor 40. The accelerator position sensor may for example comprise a potentiometer coupled to the accelerator pedal of a vehicle driven by the motor 10. The microprocessor 36 controls firing circuits 44 which supply gating signals to the thyristors $22_F$, $22_R$, $26_F$, $26_R$ and 24 of the power circuit 48 and a contactor driver circuit 46 which controls the operation of the line contactor 8. The construction and operation of these components and the programming of the microprocessor may take well-known forms. The microprocessor 36 also receives an input from a voltage sensing circuit 42 which as shown in FIG. 1 senses the voltage across the main thyristors $22_F$ and $22_R$. The voltage sensing circuit responds to the voltage across thyristor $22_F$ or $22_R$, depending on which thyristor is being pulsed, as determined by the control circuitry.

As shown in FIG. 3, during normal operation of the motor in the forward direction, the voltage V at the anode of main thyristor $22_F$ is at a voltage $V_1$ when the thyristor is non-conducting. When the thyristor $22_F$ is gated into conduction at time $t_1$ the voltage falls almost to zero and remains low until thyristor $26_F$ is gated, at time $t_2$, to reverse bias and commutate the main thyristor $22_F$. The voltage then rises from the level of the reverse biasing voltage to the voltage $V_1$, in a time dependent on the rate of charging of the commutating capacitor 24. If however the main thyristor is not commutated, the voltage will rise only to the near-zero voltage as shown by the broken line in FIG. 3. Thus by sensing the voltage V at time $t_3$, a predetermined interval after gating the commutating thyristor $26_F$, failure of commutation can be detected by failure of the voltage to reach a predetermined level. Since the period $t_3$-$t_2$ is relatively short, commutation failure can be detected very shortly after its occurrence.

In operation, if the voltage across main thyristor $22_F$ fails to rise to the predetermined level within the period $t_3$-$t_2$, the microprocessor 36 causes the firing circuit 44 to supply firing voltages to the gate electrodes of both main thyristors $22_F$ and $22_R$, and at the same time causes the contactor driver 46 to effect de-energsation of the operating coil of the line contactor 8. The main thyristors are therefore made to conduct simultaneously, so that current begins to flow through the otherwise non-energised field winding until the currents in the two field windings are equal. The net flux in the motor, and therefore the driving torque, are thus reduced rapidly to zero, in a time dependent on the field winding time constant. During this process, or shortly thereafter, depending on its drop-out time, the line contactor 9 opens, so that the motor is disconnected from the battery 20.

It will be appreciated that modifications could be made in the described embodiment. For example, many other ways of sensing failure of commutation could be used, appropriate to particular circumstances and applications of the pulse control circuit. For example, failure of commutation may be sensed by sensing excess current in the motor circuit, or by monitoring conduction of the main thyristor and sensing whether it remains conducting for longer than a predetermined time.

I claim:

1. A pulse control circuit for a d.c. series motor having an armature and two oppositely-wound field windings comprising a contactor in series with the motor, two main thyristors each connected in series with the armature and a respective one of the field windings, firing circuit means and commutation circuit means for the main thyristors, means for controlling the firing and commutation of each main thyristor thereby to control the mark-to-space ratio of the thyristor, one or other of the main thyristors being brought into operation in dependence upon the desired direction of drive of the armature, means for sensing failure of commutation of the main thyristor in operation, and means for causing opening of the contactor in response to such sensing, characterized in that there are provided means for firing the other main thyristor immediately commutation failure is sensed, thereby to establish simultaneous conduction of the two main thyristors to limit the net field flux throughout the period during which the contactor is opening.

2. A pulse control circuit as claimed in claim 1, in which the means for sensing failure of commutation of the main thyristor comprises means for sensing the voltage across the main thyristor following initiation of commutation of the thyristor and means for sensing detecting whether the voltage rises to a predetermined value within a predetermined time.

3. A pulse control circuit as claimed in claim 2, in which the means for commutating each main thyristor including an associated commutating thyristor connected in series with a commutating capacitor across the main thyristor, and the means for sensing the voltage across the main thyristor is arranged to sense the said voltage at a predetermined time after firing of the associated commutating thyristor.

4. A pulse control circuit as claimed in claim 1, in which the means for sensing failure of commutation of the main thyristor in operation comprises means for measuring the length of each period of conduction of said thyristor and for providing a fail-safe signal if the length of such a period exceeds a predetermined value.

5. A pulse control circuit as claimed in claim 1, in which the means for sensing failure of commutation of the main thyristor in operation comprises means for measuring the motor current and for providing a fail-safe signal if the motor current exceeds a predetermined value.

* * * * *